United States Patent [19]

Morander

[11] 4,375,921
[45] Mar. 8, 1983

[54] DIMENSION MEASURING APPARATUS

[75] Inventor: Karl-Erik Morander, Lerum, Sweden

[73] Assignee: Selective Electronic Co. AB, Partille, Sweden

[21] Appl. No.: 130,171

[22] Filed: Mar. 13, 1980

[51] Int. Cl.³ .............. G01B 11/06; G01V 1/02; G01D 18/00
[52] U.S. Cl. .................. 356/381; 250/560; 356/243
[58] Field of Search ............... 356/381–382, 356/447–448, 1, 243, 375–376, 371, 429, 4; 250/560, 577–578, 214 C, 201, 221, 252; 364/563, 571; 73/1 J

[56] References Cited

U.S. PATENT DOCUMENTS

| | | | |
|---|---|---|---|
| 3,289,298 | 12/1966 | Standridge | 356/371 |
| 3,393,600 | 7/1968 | Bess | 250/221 |
| 3,565,531 | 2/1971 | Kane et al. | 356/381 |
| 3,646,331 | 2/1972 | Lord | 364/571 |
| 3,819,940 | 6/1974 | Laws | 250/578 |
| 3,950,096 | 4/1976 | Aeschlimann et al. | 356/4 |
| 4,040,738 | 8/1977 | Wagner | 356/4 |
| 4,103,177 | 7/1978 | Sanford et al. | 356/448 |
| 4,225,245 | 9/1980 | Roiret et al. | 250/205 |

FOREIGN PATENT DOCUMENTS

| | | | |
|---|---|---|---|
| 2806655 | 8/1978 | Fed. Rep. of Germany | 364/571 |
| 449235 | 7/1973 | U.S.S.R. | 356/371 |

OTHER PUBLICATIONS

Poulos et al., "Calibration Fixture for Green Ceramic Sheet Thickness Sensor", *IBM Tech. Disclosure Bull.*, 4-1977, p. 4162.

Primary Examiner—William H. Punter
Attorney, Agent, or Firm—Gottlieb, Rackman & Reisman

[57] ABSTRACT

A device for accurately measuring a dimension associated with a remote object without contacting the object itself is disclosed. A beam of light is directed at a surface of the object and a reflected portion of the beam is detected at a photodetector element. The particular dimension of the object is determined mathematically by measuring the distance by which the reflected light signal is offset from a predetermined point on the photodetector which is aligned with a reference plane at the object. By the use of two heads and respective light beams and photodetectors, a remote object's thickness can also be measured.

In order to compensate for the angular relationship between the object's surface and that of the photodetector, a linearizing calibration circuit is included in which preset corrections are recorded in programmable memory units. The calibration settings are determined during manufacture and correct for each normally non-linear reading at incremental distances within a prescribed measurement range. Further accuracy of the system is obtained by using a high frequency sampling circuit to modulate the light source, with a demodulating circuit serving to discriminate between the input light beam and extraneous ambient light signals.

8 Claims, 6 Drawing Figures

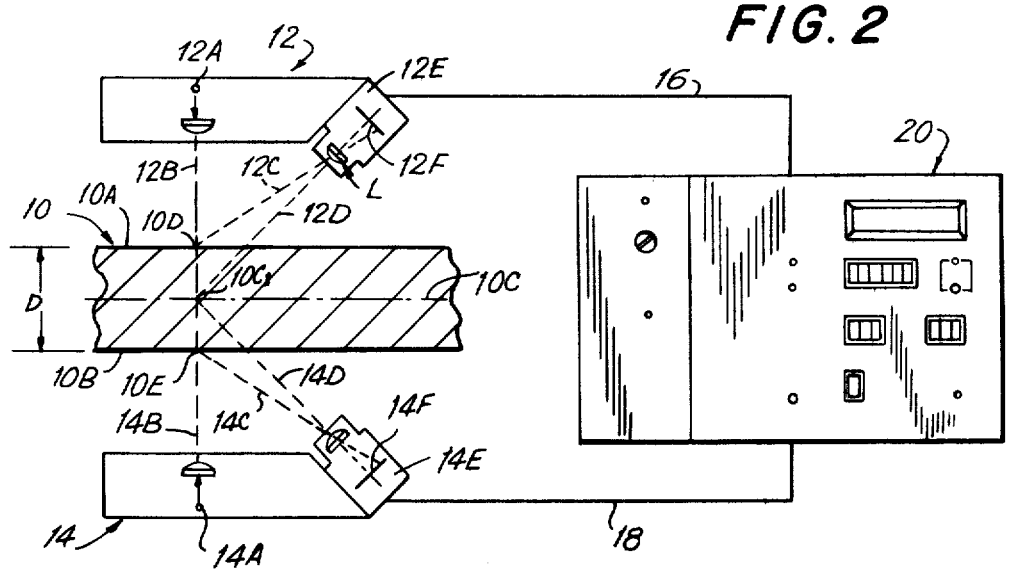
FIG. 2
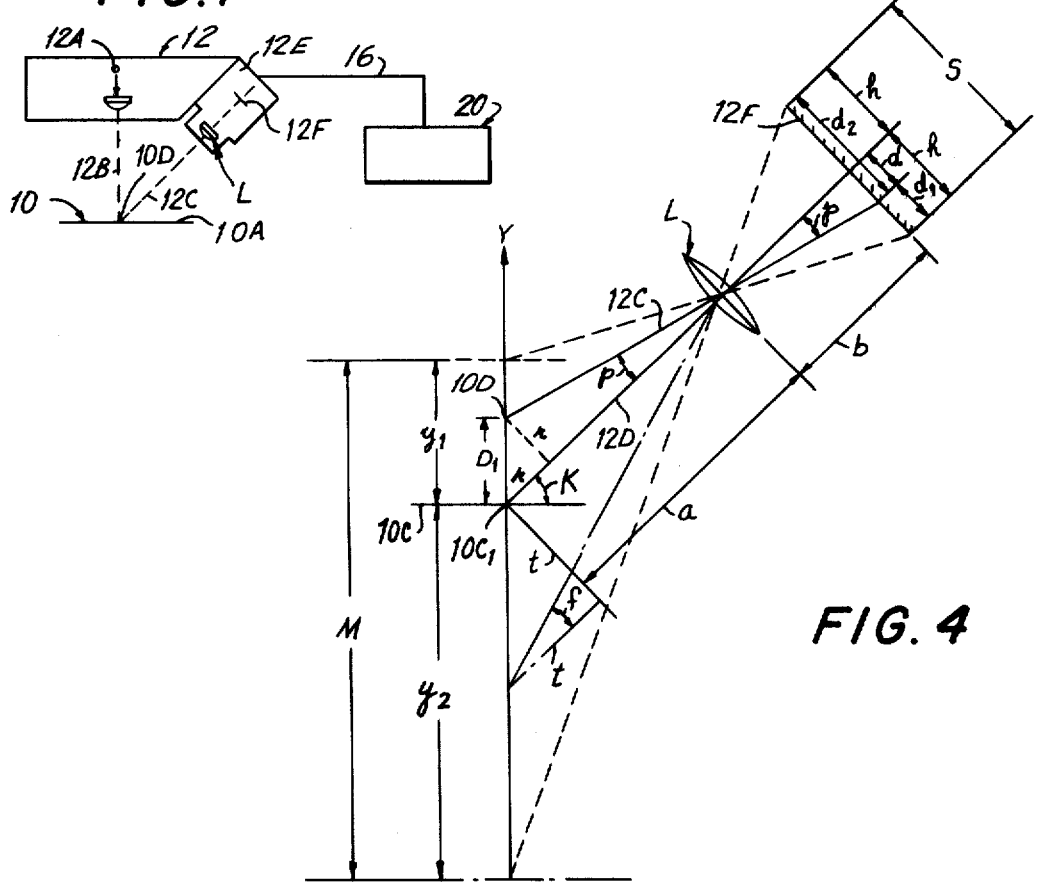
FIG. 1
FIG. 4

DIMENSION MEASURING APPARATUS

This invention relates to remote measuring in general, and to the measurement of a dimension of a distant object, without contacting the subject, in particular.

With the rapid development of numerous modern technologies, there has come a corresponding need for highly precise and accurate measurement devices and systems. Such requirements have evolved nearly as rapidly as the technologies themselves, in order to provide personnel in these fields with the capability of determining dimensions and tolerances objects which are remote from the measuring equipment or which are otherwise inaccessible to the normal contact-type devices such as standard rules, tapes, calipers and the like.

Precise measurement data is needed for many applications where the gauging or detection apparatus simply cannot be located proximate to the object to be measured. Whether the object is a roadbed, machine part, or the contour of an irregularly-shaped article, the dimension of interest is often the distance between the inaccessible object and a fixed measuring point where the detecting apparatus is located.

Another area in which this type of equipment has proven especially necessary is the manufacture and processing of shaped metals, such as steel bars and slabs. These materials are transported along assembly lines in red hot or comparable temperature conditions which obviously preclude the use of any contact measurement arrangement, or indeed any device which requires nearby supervision or participation. And yet, the need for careful monitoring of the often-changing thickness dimension of these metals is quite pronounced, given the commensurate demands for accuracy of the finished products and the ultimate use to which these products will be put.

Similar requirements for distance, profile or thickness measuring exist during the production of numerous other products, including many of those developed and utilized in the manufacture of heavy duty machines, automobiles, motors and the like. Frequently, although the parts whose dimensions are to be determined are ultimately accessible for contact measurements, it will then be too late in the process for useful corrective steps to be taken. It is also sometimes necessary for the objects to be processed in an environment which prevents direct access to the object, including radioactive and vacuum surroundings. In these and other instances, the need for a reliable and highly accurate technique of remote dimension gauging has become established.

Industry has previously addressed itself to this recognized problem and has arrived at some preliminary solutions which have proved to be generally inadequate to achieve the necessary precision for modern technology. Heretofore, it has been appreciated by the prior art that well-known trigonometric principles could be used in certain configurations to generate data that would give the distance to or the thickness of a remote object. In such earlier thickness gauging systems, beams of light were directed through beam splitting mirrors to opposite surfaces of the object to be measured. By ascertaining the relative angles of incidence and reflection with respect to the object's surfaces, suitable trigonometric rules could be applied to generate the approximate thickness of the object in question. One system of this type is disclosed in U.S. Pat. No. 3,565,531. Another prior art approach utilized the reflection of coherent light beams from a work piece and the time sampling of differential reflected images from the work piece. Such systems are represented by U.S. Pat. Nos. 3,796,492 and 3,895,870.

However, most of the prior art systems suffered from severe disadvantages of very low level accuracy and too great a dependence on the maintenance of a constant level of illumination from the source to the object's surface. Moreover, because of failure to correct the non-linearity introduced by differences between the reflection angles and the detecting surfaces, undesirable errors were introduced into the systems. In reality, the level of accuracy for most prior art systems has proven unacceptably low and the uncontrolled light variations in the systems prevented obtaining reliable readings for use by industry.

In the prior art, a basic supposition was often that the object to be measured would be stationary—this was tolerable for theoretical calculations and to verify the capability of a system (as in U.S. Pat. No. 3,565,531), but it was wholly insufficient for numerous applications in the real world as referred to above. With a stationary object, there were no problems introduced by vibrating members and either lateral or transverse motion with respect to both the light source and the detecting or measuring surface. But where such variables were introduced, they led to a virtual negating of any accuracy in the output readings, or the recognition that such wide tolerances existed as to render the readings almost useless. These failings were only in part attributable to the then-existing technology of light source generation and photodetection, although that did play a role in the somewhat primitive development of dimension measuring devices.

But even as the underlying technologies advanced, certain improvements in the non-contact measuring field were still lacking. Little attention was paid to the very common problem of inaccurate readings which were a direct result of non-linear detector readouts. Thus, although it was realized that optimum reflection for dimension measurement was usually obtained when there was a 90° angle between the impinging light beam and the reflected beam, trigonometric principles often precluded the use of such angles; this was especially true where the relevant dimension was thickness,'which was being measured by means of separate light beams being directed to opposite surfaces of an object—if corresponding acute angles were used for the impinging light beams in such cases, and especially where the object itself might be in motion, there could be no guarantee of alignment of the point on each of the opposed surfaces where the respective light beams would contact the surfaces. This led to the use of aligned light beams which were perpendicular to each of the surfaces, with the reflected beams being at a suitable acute angle to the surface. And yet, when such angles were used, appropriate corrective action was often not taken for the reflected signals which were then measured at a photosensitive surface which was itself perpendicular to the reflected beam. Since the actual thickness dimension of the object existed along the axis of the impinging light beam and the ultimate electronic measurement from the photosensitive surface was made along a different axis based upon reflected light, at least a portion of the measured dimension would necessarily be non-linear with respect to the original dimension and therefore inaccurate to that extent.

A similarly ignored problem in the remote dimension measuring field was regular monitoring of the light source itself. Although coherent light sources such as lasers were immediately recognized as highly suitable for projection and reflection for measurement purposes, it was not appreciated that comparable sophistication and accuracy in the systems required feedback control over the light source. For example, in the processing of hot metals, even where ambient light is screened out by the use of conventional light filters (which discriminate on the basis of wavelength and therefore could not be used to distinguish between laser light and most ambient light from the same region of the optical spectrum), sufficient accuracy was not attained. Other light variations either at the source, in the surrounding environment or on the measuring surface can introduce inaccuracies with respect to the reflected light signal. This, in turn, would lead to an inevitable loss of precision in the entire system.

It is therefore an object of this invention to obviate one or more of the aforesaid difficulties.

It is a further object of this invention to improve the accuracy of non-contact dimension measurement systems.

It is also an object of this invention to effectively neutralize the relative angles at which the incident and reflected light signals impinge on and emerge from the surface of an object to be measured.

It is another object of this invention to establish a substantially uniform and linear relationship between actual dimensions and corresponding measured parameters to enhance the accuracy of a dimension measurement system.

It is still a further object of this invention to monitor the intensity of the incident light source on a continuous basis to insure signal regularity and reliability of measured reflections.

These and other objects and advantages of the invention will become apparent when a particular illustrative embodiment thereof is considered, wherein a remote dimension of an object is to be measured. Either the distance of the object from the measurement apparatus can be determined, or the distances between an object's opposite surfaces and respective measuring devices can be gauged and mathematically added together to obtain the object's thickness. For explanatory purposes hereinbelow, the thickness measuring mode will be generally described. Thus, an object whose thickness is to be determined is placed at a work location between two measurement or gauging heads. The work area can either be in a movable or stationary mode of operation, depending upon the application involved. Each of the optical heads is provided with a source of controlled light, such as a laser beam. Also built into each head is a photodetector which is adapted to receive reflected or scattered light signals based upon the impingement of the input light beam on one surface of the object whose thickness is to be determined. The head also includes suitable electronic circuitry in order to assess the detected light signals and to generate information therefrom which is a measurable parameter with respect to the thickness of the object involved.

Each of the system's heads, which conveniently include the light source, detecting and processing circuits in one overall housing, is arrayed on opposite sides of the object whose thickness is to be measured. The light beams emanating from the heads are aligned with each other so as to impinge on the object's surface at corresponding opposite points, thereby eliminating any inaccuracy which might be introduced by an offset relationship between the impinging points. In the general operating mode, the light beams are caused to be incident on the surface of the object and, depending upon the nature of the object, its contour and its light absorption properties, different amounts of light will be reflected from the incident surface. However, in all cases, the principal component of reflected light will be directed away from the surface in a primary reflected light beam, which is to be detected by the photosensitive surface of the system's photodetector. The photosensitive surface of the photodetector is initially aligned with respect to a reference plane at or in the object to be measured, such that an idealized light beam reflecting from that plane to the photosensitive surface will strike the surface at 45° angle with respect to the reference plane. This type of alignment is arranged for each of the optical heads with respect to the same reference plane. Accordingly, for a light beam emerging from the source of each head and reaching the reference plane at the object, an idealized reflection from within the same plane at the object will result in a hypothetical contact with the "center" of the photosensitive surface at a 45° angle from the reference plane. Thereafter, when reflections from the actual object's opposite surfaces are received on the corresponding photosensitive surfaces, deviations from the idealized central contact point will, following suitable calculations and processing, result in a measurement of the thickness of the object itself.

In particular, the photodetector of this system utilizes a photosensitive surface which permits the generation of bifurcated current signals which can be processed by the electronics of the system to develop a dimensional measurement of the deviation from the central reflecting point referred to above. Such deviation is generated by processing the separate current signals from the detector head and mathematically dealing with them in the electronics of the system. The separate current components are amplified and filtered down to appropriate and finite signal levels. Following passage through a demodulating circuit which definitively establishes the presence of the detected signals as distinguished from other reflected light and extraneous light components, the currents are both added and subtracted and their difference is mathematically divided by their sum to generate a reference signal which is proportional to the deviation of the light impinging signal from the central hypothetical reference point. After converting this reference signal to a digital readout, the linearization of the signal is accomplished, after which the output signal from each of the surfaces of the object to be measured is added to generate the actual thickness of the object involved. A final digital display presents the ultimate readout.

As has been mentioned, the linearization circuitry in this invention affects the signal for corrective purposes when it has become a digital readout. However, the linearization signals themselves are programmed into the gauging head by a manufacturing calibration step so that when the system is completed and delivered to a customer, the entire linearization circuit is present in the electronics. Thereafter, regardless of the object to be measured and dependent only on the measurement range to be selected, for which different heads may be used, an extremely accurate and linear readout signal will always be obtained.

The linearization is achieved by a calibration technique utilizing a reflective surface mounted on a motor-driven fixture which runs on a track having optically detectable and discrete lengths of measurement. The material for the reflective surface varies with the ultimate application and the head measurement range, and can be, for example, paper, metal, or other suitable light reflecting material. The underlying metal track on which the motor-driven fixture or "sled" runs contains an embedded rod which has highly accurate length gradations engraved onto its surface. The sled, in turn, has a light sensitive diode or similar unit which picks up light signals from the lines on the glass rod to determine the position along the underlying track. As the sled moves along the track and for each of the incremental points corresponding to the lines on the rod, the regular system head projects its input light beam towards the reflective surface on the sled. The surface, operating in accordance with the basic principles of the invention as described earlier, reflects the light beam towards the photosensitive surface of the head which is also mounted at the end of the track.

Because of the fact that the light beam is impinging on the reflective surface in a perpendicular fashion (which is the same axis for which the thickness measurement is being sought), but the reflective axis is generally at a 45° orientation with respect to the reflective surface, the readings generated on an incremental basis will include measurable non-linearities. In particular, as the sled moves away from the head and thus the distance between the head and the reflective surface increases, the non-linearity will, in most cases, initially increase so that the measurement taken by the head and processed by a conventional computer in the calibration equipment detects and measures the non-linearities in the measurement cycle.

For each of the incremental distances measured on the guiding glass rod, however, a correction signal is generated by the computer. This correction is to compensate precisely for the corresponding incremental errors introduced by the non-linear measuring technique inherent in the geometry of the system. Then, either on an incremental basis or, preferably, at the conclusion of the traverse of the entire measurement range by the movable sled, the full complement of correction signals is fed into one or more memory units of the system, which generally can be included in the head itself when programmable read only memories are utilized. As a result of these successive inputs, each measurement signal, corresponding to each minute dimension within the measurement range, will have a corresponding compensating parameter associated with it. These parameters will be permanently associated with the memory unit in the head and will be present in digital form to be compared with the actual output readings to be obtained subsequently in a practical measurement cycle when the system is in actual use. Depending upon the readings obtained in actual measurement, the memory units will be instructed to make an appropriate correction for a particular measurement. The resulting signal generated by the measurement head will exhibit a substantially perfect and linear relationship between the reflected signal and the measurements to be obtained therefrom.

The system also includes means to distinguish the coherent light source utilized therein from other ambient light or extraneous light sources. The light source itself is sampled at a predetermined high frequency which will not in any sense interfere with the impinging of a virtually continuous coherent light beam on the object's surface, and yet will permit subsequent discrimination of this signal from other undesirable light sources. Following detection and generation of the bifurcated current signals mentioned earlier, the signals are amplified and filtered and are then presented to a demodulating circuit. Not only does the demodulator provide suitable discrimination from other light signals, but the demodulated signal is used in a unique fashion to control and vary the level of the original light source. More than conventional demodulation is involved, however, because the system then utilizes the bifurcated current signals to generate mathametical parameters which permit isolated comparison of the intensity of the light source with a predetermined setting. Should it be found during the course of operation of a particular cycle that the intensity of the light beam has dropped to an unacceptably low level, the circuit will increase the supply voltage to an acceptable level for maintenance of continued readings; similarly, should the beams' intensity be too great, perhaps because of a change in the nature of the surface to be measured, then the intensity will be suitably reduced. The same modulated signal can also be used to advise the output circuitry that the level of the light source is so unacceptably high or low as to draw into question the accuracy of the output signals and thereby inhibit the output display until the light source can be properly corrected.

It is therefore a feature of an embodiment of this invention to utilize a pre-calibrated linearization device which corresponds to the dimensional range of an object to be measured on a non-contact basis.

It is another feature of an embodiment of this invention to calibrate a linearization circuit member with appropriate segmental readings to cancel out non-linear readings in a dimensional measuring device.

It is also a feature of an embodiment of this invention to simulate actual dimension measurement reflections along a predetermined measuring path to generate appropriate linearizing settings.

It is a further feature of an embodiment of this invention to store linearization readings in a memory unit for subsequent readout and correction when actual readings are being taken in the field.

It is still another feature of an embodiment of this invention that a feedback loop is provided to monitor an electronic representation of the reflected light signal to insure a constant intensity of the incident light source.

It is also a feature of an embodiment of this invention that filtering and demodulating circuits are provided to discriminate between undesired ambient light and the incident light source of a predetermined frequency.

These and other objects, features and advantages of this invention will become more readily understood when considered in connection with a presently preferred, but nonetheless illustrative, embodiment of the invention as explained in the following detailed description and as shown in the accompanying drawing, wherein:

FIG. 1 is a generalized schematic view of the system of this invention, set up to measure the distance to a planar surface;

FIG. 2 is a partly schematic and perspective view of the basic components of the measuring system of this invention as adapted for either distance or thickness determination;

FIG. 4 is a simplified presentation of some of the trigonometric relationships which permit the range determination and dimension measurement of this invention;

Figure 3:
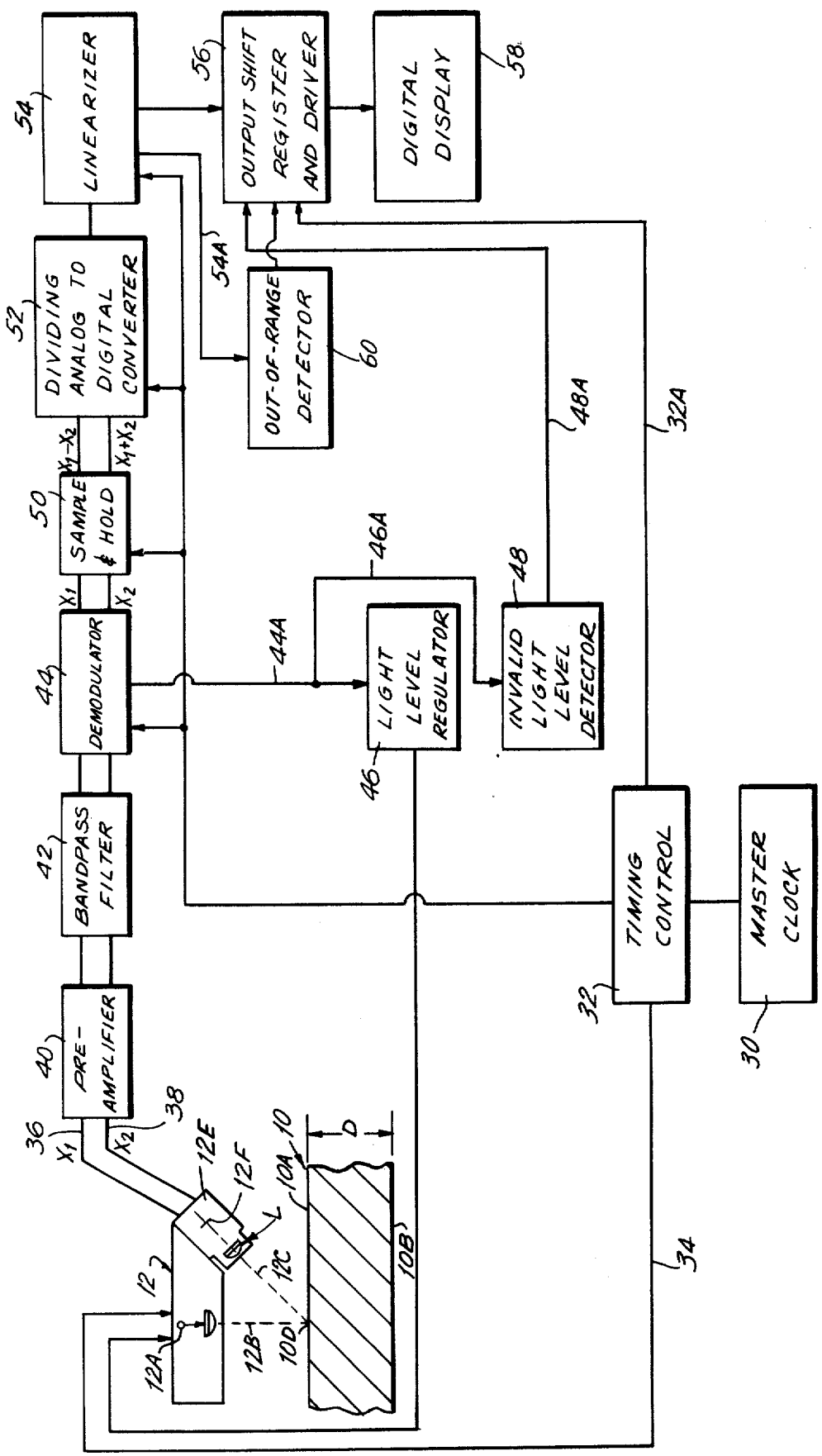
FIG. 3 is a block diagram of the invention, illustrating the generation and processing of the original and resultant signals by this invention.

The view of FIG. 1 is a generalized presentation of the invention in which an object 10 is shown at a remote location with respect to detecting head 12. In such an arrangement, it may illustratively be the distance between head 12 and the upper surface 10A of object 10 which requires measurement. In general, head 12 includes a light source 12A which directs a light beam 12B toward surface 10A, against which it impinges at point 10D. This light reflects along primary axis 12C and passes through lens system L of detecting portion 12E, arriving on photodetector surface 12F. By suitable optical and electronic processing to be described in greater detail below, the output signal representing the desired dimensional information is provided along conductor 16 to processing unit 20. It should be appreciated that the arrangement of FIG. 1, utilizing a single gauging head 12, is a single dimension measuring system, e.g., the distance between object 10 and head 12. By employing two such heads, as shown for example in FIG. 2, multiple dimensions can be ascertained, and relationships between such dimensions, including an object's thickness, can thereby be determined.

Referring to the diagram of FIG. 2, there is also shown an object 10, but in this illustration, it is shown as having a thickness D to be determined. Two separate optical heads 12 and 14 in accordance with this invention are arrayed on opposite sides of the object 10, with head 12 projecting light beam 12B from coherent light source 12A to surface 10A of the object, and head 14 projecting light beam 14B from coherent light source 14A toward surface 10B of the object. The illustration of FIG. 2 is an idealized presentation of the location and orientation of the object relative to the components of the invention; nevertheless, it can be appreciated that the object 10 can be in motion in either left-to-right or up-and-down directions because of assembly line action or possible vibration. Neither of these types of motion will substantially affect the accuracy of the operation of this system.

Under suitable controls and at appropriate times to be described below, light sources 12A and 14A of respective heads 12 and 14 cause light beams 12B and 14B to be incident on the corresponding surfaces of article 10. In so doing, the beams impact at respective contact points 10D and 10E of the object, resulting in scattered or reflected light beams 12C and 14C. The extent to which such reflection and scattering takes place will vary dependent upon the object to be measured and the surfaces' irregularities, contours and light absorption properties. However, regardless of these potential variables, the reflection characteristics of surfaces 10A and 10B are not particularly material to this invention, provided that light beams 12B and 14B are axially aligned with each other and that there are no substantial differences between surfaces 10A and 10B of the same article 10.

The reflected light beams 12C and 14C travel towards detector portions 12E and 14E, passing through lens system L, and impinge on photosensitive surfaces 12F and 14F respectively. As such photodetection occurs at surfaces 12F and 14F, measurements are made of the offset dimension between the reference center of the photosensitive surfaces and the actual contact point of beams 12C and 14C. These reference points have been previously determined by calibration measurements in accordance with hypothetical reflections from reference plane 10C within article 10—the angle between the hypothetical reflected beams 12D and 14D and their corresponding input beams is 45° and those hypothetical beams impinge at the center of corresponding photosensitive surfaces 12F and 14F. In actual practice, when real time beams 12C and 14C reflect from the opposite surfaces 10A and 10B of article 10, they arrive at photosensitive surfaces 12F and 14F at differential distances from the hypothetical centers. By means to be referred to hereinbelow, these offset distances at each head are subsequently processed, corrected for and added to give the overall dimension D of the article 10 to be measured.

Some of the processing, including the amplifying, filtering, demodulating and linearizing of the generated signals, actually takes place within electronic circuitry which may conveniently be contained within heads 12 and 14. A final processing is achieved at unit 20, which receives signals from gauging heads 12 and 14 over conductors 16 and 18 respectively. Processing unit 20 can contain conventional readout, display and actuating equipment for utilization of the thickness measurement parameters generated by the system.

A system block diagram is presented in FIG. 3 with only one set of blocks corresponding to one of the two gauging heads (12) being illustrated. Such blocks are suitable for measuring either a distance dimension or a component of the thickness D—in the latter case, it is to be understood that another head 14 will be used, in which a corresponding series of comparable blocks is included to generate a comparable measurement parameter which will be utilized together with the parameters generated from head 12 to result in a total thickness measurement. As previously noted in connection with FIGS. 1 and 2, a light source 12A is included in head 12, which may take the form of a laser diode or an infra-red LED device. Such a diode is manufactured by ITT (England) and is designated under number LB1-02. The overall system is under the control of a master clock 30 which feeds a timed signal to timing control circuit 32. Timing control circuit 32 provides a number of control signals as will be explained hereinafter; one such signal is over conductor 34 to control the switching on and off of the light source 12A in order to sample surface 10A at the appropriate rate for subsequent discrimination purposes; a typical sampling rate which can be used is 16 kHz.

The overall purpose of the system as illustrated in the block diagram of FIG. 3 is to process the measured parameter signals from the photodetector 12E and after suitable processing, filtering and identification of these signals, to mathematically arrange for a position-sensitive reading which will then be utilized to obtain one of the two component thickness measurements required to ascertain parameter D of article 10. In order to achieve the highest degree of accuracy in this procedure, it is important that extraneous signals be eliminated and that various non-linear aspects of the measurement technique be cancelled out to whatever degree possible. The present invention achieves these salutary goals as will be described below.

The photosensitive surface 12F in photodetector 12E of head 12 is capable of generating highly precise subdivided current signals which are a function of the particular impinging or contact point of reflected light beam 12C on surface 12F. As will be described further in connection with FIG. 5, the two current signals $x_1$ and $x_2$ can be utilized to generate mathematical representations of the particular point on photosensitive surface 12F where beam 12C makes contact. This, in turn, by suitable trigonometric and mathematical principles, can be the basis for the sub-component of the thickness measurement which will lead to determination of dimension D. These two current signals $x_1$ and $x_2$ are passed on respective conductors 36 and 38 to preamplifier 40. This circuit is largely conventional and serves to correspondingly amplify the two position current signals $x_1$ and $x_2$. An auxiliary function can be served by the preamplifier in blocking any photocurrent which might have been generated by the photodetector 12E and its photosensitive surface 12F in response to the presence of ambient light. Such light is generally random in nature and will be represented on the photosensitive surface by a direct current output signal. While the first stage of the preamplifier can be a DC-coupled circuit, the second stage will be coupled to the first stage by AC-coupling, thus barring the transfer of any random and non-sampled light signals. While this is not the final and definitive discriminating step, this also serves to enhance the accuracy of the system.

The signals which emerge from preamplifier 40 are fed to a bandpass filter 42, which selects the appropriate modulated signal from extraneous noise and disturbances. For example, if a 16 kHz signal has been utilized from timing control 32 with respect to light source 12A, then bandpass filter 42 is designed to filter out only a 16 kHz modulated signal. The resultant filtered signal, still in separate $x_1$ and $x_2$ components, is then supplied to demodulator 44. The demodulator 44 fulfills a number of important functions in this system. Initially, the $x_1$ and $x_2$ signals are demodulated by means of conventional full-wave rectification within demodulator 44. Built into demodulator 44 is a low pass filter which is designed to produce an output DC signal which illustratively can be of a 2 kHz band width (i.e., between zero and 2 kHz). Such filtering action can be provided when the overall demodulator 44 occupies portions of integrated circuit chips, and extra or spare portions of these same chips can be utilized for the low pass filtering function. The demodulated signals, corresponding to $x_1$ and $x_2$ DC outputs, are provided to a sample and holding circuit 50.

At the same time, a portion of the demodulated signal not utilized for strict information purposes is fed on conductor 44A to light level regulating circuit 46. For example, the signal on conductor 44A can represent the sum of signals $x_1$ and $x_2$, further representing the total generated signal from a particular light impact. It is known in advance that $x_1$ and $x_2$ should aggregate to a particular level in order to represent an appropriate light signal. If this sum is compared to a reference voltage and it is not at the appropriate level, regulator circuit 46 will adjust the light output by controlling the voltage at the diode or infra-red light source 12A. Similarly, if too great a reading results from the summing of $x_1$ and $x_2$, an appropriate reduction in the light source will be obtained. One technique of achieving this result is to control the power input to the light source itself—if the power is withdrawn from the light source in accordance with the $x_1+x_2$ readings on conductor 44A, an appropriate reduction in light output will be attained. A comparable increase in voltage signal will increase the intensity of the light source where necessary.

In addition, when an improper light level is detected as just described, the same signal from demodulator 44 is provided along conductor 46A to detecting circuit 48. In order for the system not to be relying on signals read out or displayed at the time when corrections are being applied to the light source, detector circuit 48 provides appropriate output signals along conductor 48A to the output shift register and driver circuit 56 to disable the latter circuit from providing output information to digital display unit 58. Thus, one disabling signal can be generated by circuit 48 when the light level is too low and a separate disabling signal can be generated along the same conductor when the light level is too high. However, this disabling action will only be of transient duration, since the light intensity will be promptly corrected by the foregoing circuitry and any "down time" will only last for perhaps a few milliseconds.

When the demodulated information signals $x_1$ and $x_2$ are supplied to the sample and hold circuit 50, these circuits operate to both add the input signals and to subtract them as well with appropriate and well-known circuitry, for example integrated circuit chips. Thus, one output from sample and hold circuit 50 will be the difference $(x_1-x_2)$, while the other, as illustrated in FIG. 3, will be $(x_1+x_2)$. The output information signals are then ready for processing and ultimate correction and utilization. The difference and sum signals are furnished to a dividing analog-to-digital converter 52, which serves primarily to establish the reference signal $$\frac{(x_1 - x_2)}{(x_1 + x_2)}.$$

As will be demonstrated hereinafter, that fraction acts as the position reference signal and assists in the generation of one of two subcomponents of the overall thickness D to be measured with respect to article 10. Depending upon the accuracy desired with the system, various bit levels can be utilized for the converter circuit 52. One particular accuracy level which may be considered optimum is a 12 bit converter which will provide a very high degree of accuracy. The output of converter 52 is a serial 12 bit pulse which acts as the input to the linearization circuit 54.

The correction to be applied by the linearizing circuit 54 occurs with respect to the digital form of the position signal emanating from converter 52. As the serial data from converter 52 is shifted into the linearization circuit 54, all under the control of timing control 32, the actually measured and inevitably non-linear signal represented by the 12 bit input word is presented in the form of a curve over a predetermined number of distance segments. For example, this curve, representing deviations from the normal and desired linear levels, can be divided into sixteen parts, with four parts of the curve to be corrected by each memory unit in the linearization circuit. These memory units, for example "EPROMS"

(eraseable programmable read only memory units), will have been pre-programmed in accordance with the linearization and calibration steps to be described in greater detail below. Dependent upon the measurement range over which the system is operating in each instance, the EPROMS in linearizer 54 will operate on the segmented portions of the actual non-linear signal represented by the 12 bit input word and will correct each segment of the curve on a bit-by-bit basis. (In this regard, the linearization and calibration steps will be described with respect to FIG. 6 and the correction curves referred to here are illustrated in that drawing.) In any event, the individualized and linearized signals based upon the operation of the EPROMS with respect to the input and non-linear signal, will be accurate to within $(1/2^{11})$ of the measuring range. For example, where an 8 millimeter range is involved, a typical range with the present invention, the resolution of the system is established within 8 millimeters divided by 4096, i.e., approximately 2 microns. Similar high accuracy readings can be obtained with this system where other ranges are involved, such as a resolution of 4 microns for a range of 16 millimeters and a resolution of 8 microns for a range of 32 millimeters.

The programmable read only memories within linearization circuit 54 also indicate to the out of range detector 60 when the signal from the converter 52 is so far out of the indicated measurement range for that particular application as to warrant disabling the system and either changing the head to accommodate the new range or at least not relying on the output information. To the extent that the range is not appropriate for the particular reading, a signal or disabling bit can be supplied from out of range detector 60 to output shift register 56 to prevent the further operation of the output portion of the system.

When the linearized 12 bit signal has been supplied by linearizer 54 to output shift register and driver 56, a complete output signal is then provided to digital display unit 58. Assuming that there has been no disabling signal received from either the invalid light level detector 48 or the out of range detector 60, the signal received from linearizer 54 will be a substantially and precisely accurate one which, under the control of timing control circuit 32 along conductor 32A, can provide 12 bits of information out to digital display unit 58. Additional bits can be added by shift register 56 so that the output signal to digital display 58 can provide additional information useful in the readout of the dimensional component with respect to thickness D. The total number of bits can, for example, be sixteen, with the additional four bits added by shift register 56 representing error-checking information.

The thickness measurements capable of being attained with this invention are based upon the existence of controllable and workable mathematical and trigonometric relationships. These relationships serve to permit the determination of an appropriate measurement range by the use of optical focal length calculations and also are utilizable for determination of the thickness components of the dimension D referred to hereinabove. In this regard, reference is made to FIG. 4 for an exposition of the relationships which permit both measurement range and thickness to be ascertained by the present invention.

It will be recalled from FIG. 2 that when the dimension to be measured is the thickness D of object 10, two separate heads 12 and 14 are utilized on opposite sides of the object. Each of the heads 12 and 14 provides a subcomponent of the overall thickness measurement as a digital readout to unit 20 (FIGS. 1 and 2) in order to determine the composite thickness. The block diagram of FIG. 3 illustrates the relationship between head 12 and the upper surface 10A of article 10, indicating the manner in which a position-sensitive signal can be generated on the basis of bifurcated currents $x_1$ and $x_2$. Just as FIG. 3 illustrates the generation of these current signals from only the upper surface 10A of article 10, FIG. 4 will now be explained in connection with only the upper incident and reflected light beams and the respective photodetector 12E (not shown in FIG. 3). As the result of the trigonometric relationships to be explained hereinafter, a thickness subcomponent $D_1$ is generated in mathematical form and this relates to the distance between the upper surface 10A of article 10 and reference plane 10C hypothetically within article 10 (see FIG. 1). In a similar fashion, a subcomponent which may be termed $D_2$ (not shown) is generated on the basis of incident and reflected light beams with respect to lower surface 10B and head 14, and in the electronics to be described, the subcomponents $D_1$ and $D_2$ are added in order to generate the overall thickness parameter D. (If only the one-side distance is the dimension sought, then the addition step need not be performed; however, the basic detection, measurement and correction functions are substantially the same.)

In examining the geometry of FIG. 4, it will be noted that this drawing is based upon the incident and reflected light signals with respect to surface 10A of article 10 in FIG. 2, with some additional lines and notations added for explanatory and descriptive purposes. Initially, the Y-axis is essentially coincident with the axial dimension from light source 12A to contact point 10D in FIG. 2. It has been noted that this is an orthogonal relationship with respect to surface 10A and while this is desirable for the incidence of light beam 12B on surface 10A, it does introduce the non-linearity which will be corrected as is explained hereinafter. Similarly, the principal component of the reflected light beam has been designated 12C in FIG. 1 and that notation is carried over into FIG. 3. As the reflected beam 12C reflects off surface 10A and proceeds towards photosensitive surface 12F, it passes through a lens system L which is only generally designated in FIGS. 1, 2, 3 and 4 in the form of a generally convex lens; it will be appreciated by those skilled in the art that the focusing optics in representative lens system L can be arranged to focus the reflected beam on photosensitive surface 12F—the calculation of the focal length for system L will also be described below.

Reference plane 10C is indicated as the X-axis in FIG. 4 and the point of incidence of the actual light beam on surface 10A is indicated at 10D along the Y-axis in FIG. 4. The hypothetical intersection of light beam 12B with reference plane 10C is indicated at point $10C_1$ in FIGS. 2 and 4. Angle "K" between hypothetical reflected beam 12D and either the X or Y axes is 45° and after passing through lens system L, beam 12D arrives on photosensitive surface 12F at substantially the geometrical midpoint thereof. This divides the photosensitive surface into two halves, each of which has been designated "h", with the overall length of the photosensitive surface 12F being designated S. It has been previously stated that when the actual light beam 12B from source 12A is incident on surface 10A at point 10D, the reflected beam 10C emerges at a particular angle dependent upon the nature of the article whose thickness is to be measured, including its surface characteristics and contour. Regardless of those parameters, the principal component of the light beam is reflected at 12C and passes through lens system L and focuses at a point on photosensitive surface 12F which is offset from the center by the dimension "d". The angle between the perfect axial reflection of hypothetical beam 12D and that of actual beam 12C is designated "p". The angle defined on the other side of lens system L and opposite p is, of course, also p, and the distance between actual contact point 10D and hypothetical contact point 10C₁ is the subcomponent $D_1$ which it is desired to isolate mathematically. This latter component is noted to be the hypotenuse of an isoceles triangle whose legs have been designated "r". Below the reference plane 10C, another isoceles triangle is present with equal legs "t". Distances "a" and "b" have been labelled to indicate, respectively, the distance between reference plane 10C and lens system L and from lens system L to photosensitive surface 12F, both dimensions being measured axially along beam line 12D and in a direction perpendicular to photosensitive surface 12F. The final parameter shown in FIG. 4 is the overall measurement range for a particular measurement cycle, defined as M, which is equivalent to $y_1+y_2$.

Initially considering the manner in which the system can be utilized to calculate the measurement range M, it is first noted that $$\tan p = \frac{d}{b} \tag{1}$$

where d is equal to the center offset distance at which beam 12C contacts photosensitive surface 12F. Similarly, it is also noted that $r^2+r^2=y^2$, where r is as indicated on FIG. 4 and "y" is any dimension in the Y-axis direction. As a result, $$y = \sqrt{2}\, r \tag{2}$$

$$r = \frac{y}{\sqrt{2}}$$

Proceeding back to the original tangent relationship (1), this time for the opposite angle "p", $$\tan p = \frac{r}{a - r}$$

Substituting the value of r from formula (2) into this tangent formula, we have for the general case, $$\tan p = \frac{\frac{y}{\sqrt{2}}}{a - \frac{y}{\sqrt{2}}} = \frac{y}{\sqrt{2}\, a - y} \tag{3}$$

Regardless of the particular angle "p" between the actual and hypothetical reflected beams 12C and 12D, the tangent relationships (1) and (3) can be equated to each other. In this case, the Y-dimension in the positive direction is taken above reference plane 10C, i.e., the relationship is defined with respect to $y_1$ in FIG. 4 and assumes d=h:

$$\frac{h}{b} = \tan p = \frac{y_1}{\sqrt{2}\, a - y_1} \tag{4}$$

$$\sqrt{2}\, ah - y_1 h = y_1 b$$

$$y_1 = \frac{\sqrt{2}\, ah}{b + h}$$

This establishes the portion of the measurement range M above the reference plane 10C as illustrated in FIG. 4. In order to calculate the other component of the measurement range, $y_2$, it is initially noted that a tangent relationship exists in the right triangle defined by the sides t and (a+t). This tangent relationship is also independent of the particular angle involved, but the isosceles triangle which includes "t" as each of the equal legs can be defined generally in terms of any y dimension as follows:

$$\tan f = \frac{t}{a+t} = \frac{\frac{y}{\sqrt{2}}}{a + \frac{y}{\sqrt{2}}} \tag{5}$$

$$\tan f = \frac{y}{\sqrt{2}\, a + y}$$

Since tan f also can be specifically defined as h/b, the negative dimension $y_2$ can be calculated as follows:

$$\frac{-h}{b} = \frac{y_2}{\sqrt{2}\, a + y_2} \tag{6}$$

$$-\sqrt{2}\, ah - y_2 h = -y_2 b$$

$$y_2 = \frac{\sqrt{2}\, ah}{b - h}$$

To determine the measurement range M, it is noted that once $y_1$ and $y_2$ have been determined (formulas (4) and (6)), they are merely added to obtain the measurement range M. This defines what is essentially the maximum excursion permitted between the upper surface 10A and the bottom surface 10B of article 10 which photosensitive surface 12F is capable of accepting. If the thickness measurement D exceeds measurement range M, accuracy of the system will either be lost or markedly reduced.

In order to ascertain the appropriate focal length for lens system L in terms of the usual optical parameters which permit the calculation of focal length, namely distances a and b, it can be assumed that distance b is fixed and known. This is the distance between the location of lens system L and photosensitive surface 12F. As illustrated in FIG. 2, for example, this dimension is contained within photodetector portion 12E of head 12; accordingly, while the lens system L may change depending upon the measurement range desired, the distance b between lens system L and photosensitive surface 12F can be kept constant. It is therefore significant to determine the measurement range M by calculating component $y_1$ in terms of the variable distance a and the generally fixed distance b. At the same time, $y_2$ can be expressed in terms of $y_1$ and the measurement range M and the y parameter can thereby be eliminated from the calculation.

The mathematical relationships considered here are as follows (using formula (6)): $y_1 + y_2 = M$ $$y_1 = M - y_2 = M - \frac{\sqrt{2}\, ah}{b-h}$$

Utilizing formula (4) above, $$M - \frac{\sqrt{2}\, ah}{b-h} = \frac{\sqrt{2}\, ah}{b+h}$$

After factoring and placing this relationship into polynomial form, we have:

$$Mb^2 - 2\sqrt{2}\, ahb - Mh^2 = 0 \qquad (7)$$

Applying the quadratic formula and simplifying, $$b = \frac{2ah}{M}\left(1 + \sqrt{1 + \frac{M^2}{2a^2}}\right) \qquad (8)$$

We have thus established the value of b in terms of the measurement range M, a particular hypothetical dimension a and a predetermined portion h of the photosensitive surface 12F. Utilizing the dimension of b which has now been determined, the well-known relationship $$\frac{1}{F} = \frac{1}{a} + \frac{1}{b}$$

can be used to establish the focal length F for lens system L. Once it is known what a particular measurement range M is to be, and the on-site measurement access to article 10 has been established, thus providing us with "a" as a dimension, the photosensitive surface dimension "h" being fixed, the dimension b is established as is the focal length F.

The thickness (or distance) calculations themselves as performed by this system have mathematical counterparts dependent upon the relationships expressed in FIG. 4. The basic introductory point is that the offset distance d between the hypothetical midpoint of photosensitive surface 12F and the actual point of contact of reflected beam 12C is a proportional measurement for the thickness subcomponent $D_1$ to be obtained by means of head 12. Using the tangent relationship previously mentioned, i.e., $$\tan p = \frac{d}{b},$$

it then follows that:

$$d = b(\tan p) = b\left(\frac{y}{\sqrt{2}\, a - y}\right) \qquad (9)$$

$$\sqrt{2}\, ad - yd = by$$

$$\sqrt{2}\, ad = by + dy$$

$$y = \frac{\sqrt{2}\, ad}{b+d}$$

The dimension y is a general parameter based upon the distance between actual contact point 10D and theoretical contact point $10C_1$ for reference plane 10C (see FIG. 4). This has been labelled in FIG. 4 as dimension $D_1$. Accordingly, for the particular case illustrated in FIG. 4, $y = D_1$. This therefore establishes the "upper" thickness subcomponent $D_1$ in terms of known parameters a and b, established before the system is placed into use, and d, which is a measured dimension depending upon the particular cycle involved. It will be indicated below in connection with a description of FIG. 5 how this dimension d is calculated electronically and mathematically. Suffice it to say at this point that head 12 performs the detection and calculations to generate dimension $D_1$, while head 14 (if used) performs comparable measurements and calculations to obtain the other component $D_2$ (not shown); the addition of components $D_1$ and $D_2$ results in D, the thickness of article 10 as shown in FIGS. 1 and 2.

Figure 5:
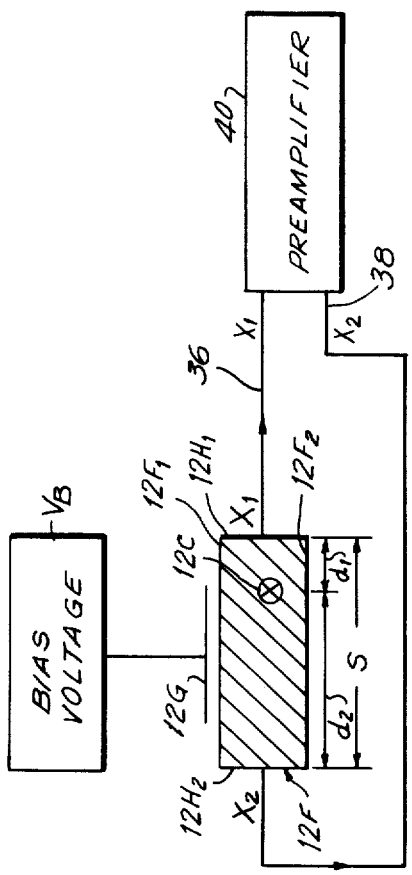
FIG. 5 is a view of the detector portion of the invention illustrating the development of subdivided current signals $x_1$ and $x_2$ from a photodetecting element.

In order to permit the system to develop an electronic representation of the off-center dimension d as noted in FIG. 4, a photosensitive member 12F is utilized which has photosensitive elements between upper surface $12F_1$ and lower surface $12F_2$ in FIG. 5. The presence of these elements permits the generation of photocurrents $x_1$ and $x_2$, which are dependent upon the relative spacing of the contact point of reflected beam 12C and the side electrodes $12H_1$ and $12H_2$ (FIG. 5). This photosensitive member is of the type described in the article "Position Sensitive Light Detectors with High Linearity" by Goran P. Petersson and Lars-Erik Lindholm, *IEEE Journal of Solid-State Circuits*, Volume SC-13, No. 3, June, 1978, pages 392–399. Utilization of this type of position-sensitive light detector permits nearly distortion-free detection and the generation of suitably proportionate current parameters utilizable to define the contact dimension of a reflected light beam.

The appropriate bias voltage is applied from source $V_b$ at electrode 12G and when light 12C is reflected from surface 10A and passes through lens system L and arrives at photosensitive surface 12F, its "tail" is designated at 12C in FIG. 5. For calculation purposes, it is noted that the overall length of photosensitive surface 12F is S, whereas the dimension between the contact point of beam 12C and electrode $12H_1$ is $d_1$, the other dimension between the contact point and electrode $12H_2$ being designated $d_2$. (It has already been noted in discussing FIG. 4 that the photosensitive surface S is divided into two halves "h" and that the off-center dimension is d—the relationship between those parameters and electronically detected parameters $d_1$, $d_2$ will be demonstrated below.)

In accordance with the principles described in the IEEE article, two currents are generated by the arrival of reflected light beam 12C on photosensitive surface 12F. A first current $x_1$ passes between the contact point of beam 12C and electrode $12H_1$, while a second current $x_2$ passes from the contact point to electrode $12H_2$. The total current $x_1 + x_2$ is a fixed amount, generally in the range of 5 microamperes, which can be controlled by the setting of the bias voltage $V_b$ and by knowing the characteristics of photosensitive surface 12F. This total current divides as indicated immediately above and passes over resistive portions of the photosensitive surface 12F. For this discussion, the resistive portion traversed from the contact point to electrode 12H$_1$ is defined as $kd_1$, while the counterpart portion for current $x_2$ is $kd_2$. At the dividing point of the currents $x_1$ and $x_2$, it is known that the currents will divide in inverse proportion to the resistivity values between the contact point and the corresponding electrodes. Accordingly, it may be stated that $$\frac{x_1}{x_1 + x_2} = \frac{kd_2}{kd_1 + kd_2} \qquad (10)$$

$$x_1 = \frac{d_2(x_1 + x_2)}{d_1 + d_2}$$

Similarly, in developing comparable expressions for $x_2$:

$$\frac{x_2}{x_1 + x_2} = \frac{kd_1}{kd_1 + kd_2} \qquad (11)$$

$$x_2 = \frac{d_1(x_1 + x_2)}{d_1 + d_2}$$

In establishing the difference between the $x_1$ and $x_2$ current components, which represents the off-center parameter to be utilized later, $$(x_1 - x_2) = \frac{d_2(x_1 + x_2)}{d_1 + d_2} - \frac{d_1(x_1 + x_2)}{d_1 + d_2} \qquad (12)$$

$$(x_1 - x_2) = \frac{(x_1 + x_2)(d_2 - d_1)}{d_1 + d_2}$$

In order to develop a position reference signal for utilization by the circuit electronics, it is noted (from equation (12)) that:

$$\frac{x_1 - x_2}{x_1 + x_2} = \frac{d_2 - d_1}{d_1 + d_2} = \frac{d_2 - d_1}{S} \qquad (13)$$

It has now been established, both physically and, in the circuit itself electronically, that the dimension $$\frac{d_2 - d_1}{S}$$

is a position reference signal, dependent upon the particular $d_1$ and $d_2$ measurements in each measurement cycle. In describing FIG. 3 previously, the electronic parameter $$\frac{x_1 - x_2}{x_1 + x_2},$$

which equals this position reference signal, was the signal provided to the linearizing circuit 54. The significance of this reference signal is that it can be utilized to assist in the computation of the dimension d in FIG. 4 by means at photosensitive surface 12F in FIG. 5. This in turn permits the calculation of thickness subcomponent $D_1$ as indicated heretofore. Commencing with the known relationship that $d_1 + d_2 = S$ and, regardless of the resistance values, that current signals $x_1$ and $x_2$ can provide us with the signal $$\frac{d_2 - d_1}{S}$$

(see equation (13) above), it can then follow that $$d_1 + d_2 = S$$

$$d_2 - d_1 = T,$$

where "T" is the differential dimension between the two lengths $d_2$ and $d_1$. This leads to $$d_1 = \frac{S - T}{2}.$$

In relating the off-center dimension d to the measured or detected dimensions $d_1$ and $d_2$, it is noted that $$d = \frac{S}{2} - d_1 \qquad (14)$$

$$d = h - d_1 = h - \left(\frac{S - T}{2}\right).$$

Since the parameters S and h are known based on the physical dimensions of the photosensitive surface 12F, and the dimension T is established electronically as the result of the bifurcated currents $x_1$ and $x_2$ and the development of the position sensitive signal $$\frac{d_2 - d_1}{S},$$

the dimension d can be calculated as just indicated at (14). In then referring back to the thickness calculation previously discussed (e.g., see equation (9), the dimension $D_1$ is established in terms of dimensions a and b and electronically computed dimension d.

However, as has been indicated previously, the signals generated from photosensitive surface 12F, while representative of the desired dimension d and utilized to calculate component $D_1$, are still not precisely linear because of the differential angles between incident beam 12B and the reflected beam 12C and its associated photosensitive surface 12F. In order to correct for this nonlinearity and to thereby enhance the accuracy of this invention, a linearizing circuit 54 has been described heretofore. The linearization step is a predetermined calibration procedure achieved through the means indicated in FIG. 6.

Figure 6:
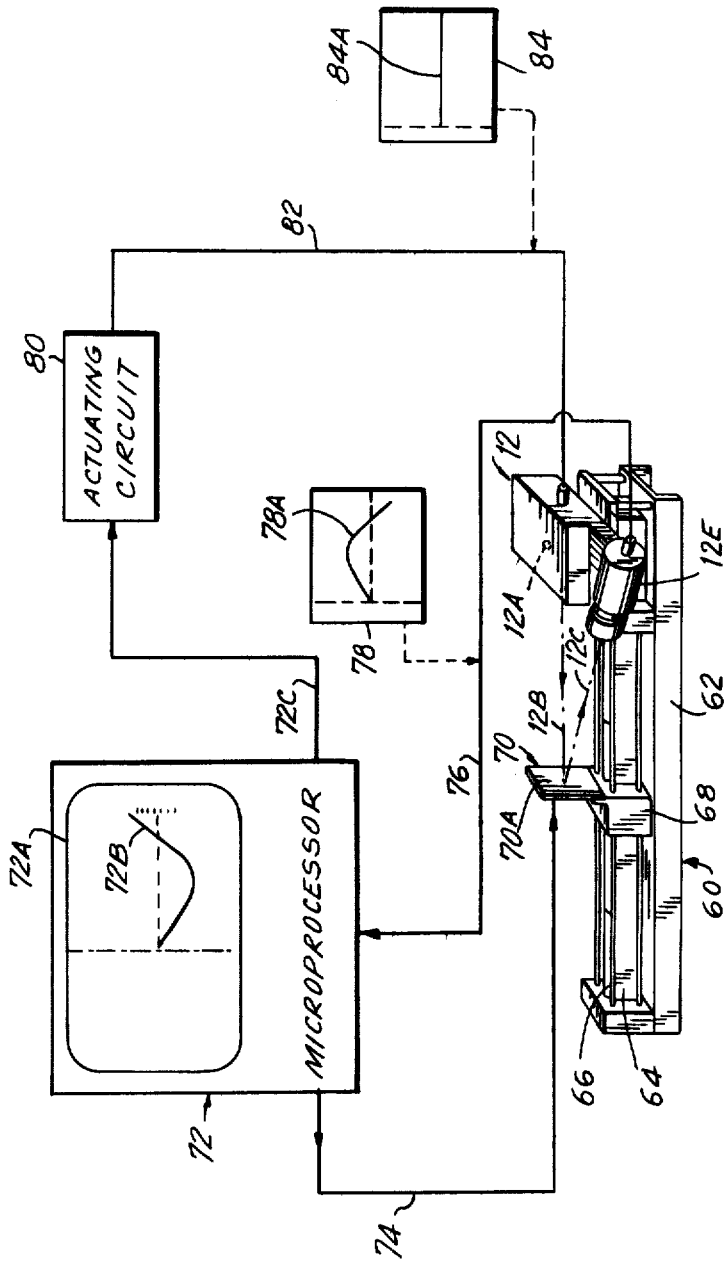
FIG. 6 is a partly schematic and perspective diagram of the external linearization and calibration apparatus in accordance with this invention.

At the lower portion of FIG. 6, a base support member 60 is indicated which can be constructed in a laboratory or suitable manufacturing location. The device includes a support member 62 and a finely machined track 64, embedded within which is a precision glass rod 66 having discrete and optically detectable distance segments engraved or otherwise marked thereon. (Such a rod can be of the type manufactured by J. Heidenhain Company of Taunreut, West Germany and designated as the LS 701.) Mounted on track 64 for movement with respect thereto is a "sled" 68 which can be motor driven by suitably conventional means (not shown). The sled 68 has an upper reflective carrying member 70 which is illustrated as having mounted thereon reflective surface 70A. This surface is one which may vary in accordance with the ultimate application of the invention, but which can take the form of light reflecting surfaces, including paper, metal, rubber and plastic. The object of the calibration system indicated in FIG. 6 is to generate light signals in the usual manner done in FIG. 2, and to measure the actual reflected light beam values again in the usual manner as if in a measurement cycle. Then, the actual measurement departures from a linear signal are determined and appropriate compensating signals are developed to cancel out the non-linearities and to develop a predetermined linear signal.

At the right end of support member 62, head 12 is mounted in a convenient orientation, with light source 12A focused on member 70 and reflective surface 70A thereof, such that light beam 12B reflects off surface 70A and, in the form of scattered signal 12C, arrives at photodetector portion 12E. This projection and reflection arrangement occurs with respect to an entire sequence of positions for sled 68 within a particular measurement range desired for the unit. For example, where an eight millimeter measurement range is involved, rod 66 may have discretely detectable intervals each two microns along its length; accordingly, this would require approximately 4000 separate measurements in order to correct for each of the measurements taken at each two micron distance within an eight millimeter range.

In considering a particular calibration and linearization cycle, head 12 focuses its light beam 12B from coherent source 12A on reflective surface 70A at a first point in the movement of sled 68 on track 64—the position of this movement is determined by a particular marking on rod 66, which is detected by a light sensitive means (not shown) within sled 68—the signal is detected and microprocessor 72 causes sled 68 to move a particular distance until the next marking point for measurement purposes is reached. When such point is arrived at, head 12 is activiated to generate light beam 12B and thus scattered light signal 12C, which is detected at detector portion 12E. This signal appears on representative conductors 76 and the gradual development of the entire path of such signals is shown in representative graph 78. Because of the angular relationships between photosensitive surface 12F and the axial line beam 12B and the thickness component D, curve 78A initially begins to go positive as measurements are taken through the measurement range. The measurements then reach a peak and begin to decrease, crossing the horizontal axis and actually becoming negative in the latter portion of the range. As each of these measurements is detected and made, they are fed to microprocessor 72 which stores them in a memory unit. A corresponding set of compensating parameters is then developed periodically by the microprocessor. These dimensions are indicated in representative graph 72A, in which curve 72B is illustrated. It will be noted that as actual curve 78A begins to go positive and reach a positive peak, curve 72B immediately begins to go negative and approaches a corresponding negative peak. The latter curve then begins to go positive to take into account the negative-going excursion of actual curve 78A. In fact, it can be stated that curve 72B is the precise negative of curve 78A. For each of the discrete measurement intervals on curve 78A in actual measurement cycles, curve 72B has developed a corresponding correction figure which, in effect, cancels out the non-linear portion of curve 78A.

When sled 68 has completed its travel through the predetermined measurement range, the accumulated compensating signals represented by curve 72B are then ready for incorporation into the programmable read only memory units within head 12. When it has been determined that the measurement cycle is complete, and that all measurements have been taken within a range, the microprocessor 72 activates actuating circuit 80 over conductor 72C, and appropriate correction signals, based upon curve 72B, are written into the programmable memory units in head 12. These signals, constituting the 12 bit correction word discussed earlier, result in an ultimate linear signal to be provided for display purposes to unit 20 (FIG. 2) and to unit 58 (FIG. 3). The linearity of the measurement signal with respect to every dimension in the measurement range is indicated by graph 84 and in particular, by flat and horizontal axis line 84A.

Thus, head 12 itself has been provided with "portable" correction signals which are keyed to a particular measurement range for which head 12 is designed. At each measurement point within the range, as previously determined by the markings on rod 66, the memory units within head 12 have, in their memories, corresponding compensating and correcting values generated by microprocessor 72 and now by virtue of actuating circuit 80, placed into memory units over conductor 82. Thus, regardless of the particular position occupied by head 12 with respect to an ultimately measured article 10 within a given measurement cycle, the non-linear curve 78A which would normally be measured is replaced by the substantially linear line 84A. Accordingly, the system of this invention has provided not only for the linearization of a potentially incorrect measurement signal, but has also arranged to control and properly select the appropriate light source signal for correction and intensity maintenance purposes as previously described.

It is to be understood that the above described embodiments are merely illustrative of the application of the principle of this invention. Numerous variations may be devised by those skilled in the art without departing from the spirit or scope of the invention.

I claim:

1. Apparatus for measuring a dimension associated with a remote object having at least one reflective surface comprising in combination a source of controllable light directed at said surface at a first predetermined angle to generate a corresponding reflected light signal, detection means for receiving and measuring said reflected light signal at a second predetermined angle, means for developing a transmittable signal based on said reflected light signal for readout of said dimension, correction means for adjusting said transmittable signal to eliminate non-linear errors attributable at least to the lack of perpendicularity between said first and second predetermined angles, and output means for processing said adjusted transmittable signal to generate an output display signal corresponding to said dimension of said remote object, wherein said dimension represents the distance between a predetermined point and said reflective surface of said object, and wherein said correction means includes pre-calibrated control means for developing a group of linearizing signals dependent on at least said lack of perpendicularity and on the material comprising said object to adjust said transmittable signal in accordance with a comparison of said transmittable signal and a selected one of said linearizing signals, wherein said pre-calibrated control means includes a programmable memory unit for receiving periodically generated correction signals during a separate calibration cycle, wherein said correction means further includes guiding means for providing a fixed transport path, means movable along said guiding means for establishing a positionally controllable detecting surface, means mounted on said guiding means for generating calibration signals comparable to said controllable light source signal and said reflected light signal, means for determining the non-linear departure of said calibration signals corresponding to said reflected light signal, means for effectively cancelling said non-linear departure in said calibration signals corresponding to said reflected light signal and for delivering said correction signals to said memory unit, and control means included in said movable means for monitoring the movement of said detecting surface at discrete detectable positions along said transport path and for causing said correction signals to be generated and communicated to said memory unit for each of said discrete detectable position on said guiding means.

2. Apparatus in accordance with claim 1, wherein the terminal ends of said discrete detectable positions define a predetermined measuring range for each of a group of said remote objects having said dimension falling within said range.

3. Apparatus in accordance with claim 2, wherein said detection means includes a lens system of a focal length corresponding to said measurement range.

4. Apparatus in accordance with claim 1, wherein said guiding means includes a track member to define said transport path and an optical member to define said discrete detectable positions along the length thereof, said movable means includes a sled having a photosensitive member in said control means for determining each of said detectable positions along said guiding means, said means mounted on said guiding means including a control head for detecting said reflected light signals at each of said detectable positions, said determining means including an electronic processing unit for comparing said reflected light signal with an ideal measurement standard therefor, activating means coupled to said determining means for generating signals to adjust said reflected light signal to said ideal measurement standard at each of said discrete detectable positions, and wherein said control means includes said programmable memory unit for storing said signals from said activating means for subsequent utilization in said correction means of said apparatus.

5. Apparatus for measuring the thickness of a remote object having reflective surfaces comprising in combination a source of controllable light directed at each of said surfaces at a first predetermined angle to generate corresponding reflected light signals, detection means for receiving and measuring said reflected light signals at a second predetermined angle, means for developing transmittable signals based on said reflected light signals for readout of said thickness, correction means for adjusting said transmittable signals to eliminate non-linear errors attributable at least to the lack of perpendicularity between said first and second predetermined angles, and output means for processing said adjusted transmittable signals to generate an output display signal corresponding to said thickness of said remote object, wherein said correction means includes pre-calibrated control means for developing a group of linearizing signals dependent on at least said lack of perpendicularity and on the material comprising said object to adjust said transmittable signals and a selected one of said linearizing signals, and wherein said pre-calibrated control means includes a programmable memory unit for receiving periodically generated correction signals during a separate calibration cycle, wherein said correction means further includes guiding means for providing a fixed transport path, means movable along said guiding means for establishing a positionally controllable detecting surface, means mounted on said guiding means for generating calibration signals comparable to said controllable light source signal and said reflected light signals, means for determining the non-linear departure of said calibration signals corresponding to said reflected light signals, means for effectively cancelling said non-linear departure in said calibration signals corresponding to said reflected light signals and for delivering said correction signals to said memory unit, and control means included in said movable means for monitoring the movement of said detecting surface at discrete detectable positions along said transport path and for causing said correction signals to be generated and communicated to said memory unit for each of said discrete detectable positions on said guiding means.

6. Apparatus in accordance with claim 5, wherein the terminal ends of said discrete detectable positions define a predetermined measuring range for each of a group of said remote objects having a thickness falling within said range.

7. Apparatus in accordance with claim 6, wherein said detection means includes a lens system of a focal length corresponding to said measurement range.

8. Apparatus in accordance with claim 5, wherein said guiding means includes a track member to define said transport path and an optical member to define said discrete detectable positions along the length thereof, said movable means includes a sled having a photosensitive member in said control means for determining each of said detectable positions along said guiding means, said means mounted on said guiding means including a control head for detecting said reflected light signals at each of said detectable positions, said determining means including an electronic processing unit for comparing each of said reflected light signals with an ideal measurement standard for said signals, activating means coupled to said determining means for generating signals to adjust said reflected light signals to said ideal measurement standard at each of said discrete detectable positions, and wherein said control means includes said programmable memory unit for storing said signals from said activating means for subsequent utilization in said correction means of said apparatus.

* * * * *